United States Patent [19]

Dammann

[11] 4,277,138
[45] Jul. 7, 1981

[54] DIFFRACTION GRATING AND SYSTEM FOR THE FORMATION OF COLOR COMPONENTS

[75] Inventor: Hans Dammann, Tangstedt, Fed. Rep. of Germany

[73] Assignee: U.S. Philips Corporation, New York, N.Y.

[21] Appl. No.: 24,285

[22] Filed: Mar. 26, 1979

Related U.S. Application Data

[63] Continuation of Ser. No. 838,632, Oct. 3, 1977, abandoned.

[30] Foreign Application Priority Data

Oct. 6, 1976 [DE] Fed. Rep. of Germany ....... 2645075

[51] Int. Cl.³ .................... G02B 27/44; G02B 25/18
[52] U.S. Cl. ............................... 350/162 R; 350/1.1; 350/169
[58] Field of Search ............. 350/162 SF, 162 R, 1.1, 350/168, 169, 171, 314

[56] References Cited

U.S. PATENT DOCUMENTS

| 2,769,111 | 10/1956 | Sadowsky | 350/162 R |
| 3,488,124 | 1/1970 | Lamberts | 350/162 R |
| 3,883,232 | 5/1975 | Tsunoda | 350/162 SF |
| 3,911,479 | 10/1975 | Sakurai | 350/162 SF |

Primary Examiner—Ronald J. Stern
Attorney, Agent, or Firm—Marc D. Schechter

[57] ABSTRACT

A device for spacially separating specific spectral regions, preferably of color components from a wideband spectrum which is actively and/or passively radiated by objects. The spectral regions, or color components, are derived from the diffraction orders of a diffraction grating (phase grating), which is disposed in the pupil of an imaging lens and whose groove profile consists of several steps, which produce path length differences which are integral multiples of a specific wavelength.

11 Claims, 5 Drawing Figures $(n-1)d_1 = 2\lambda g$
$(n-1)d_2 = 4\lambda g$

DIFFRACTION GRATING AND SYSTEM FOR THE FORMATION OF COLOR COMPONENTS

This is a continuation of application Ser. No. 838,632, filed Oct. 3, 1977 now abandoned.

BACKGROUND OF THE INVENTION

The invention relates to a device and a system for spacially separating specific spectral regions, preferably color components of a wide-band spectrum, multichromatic light, which is actively and/or passively radiated by objects. Various devices for the production of color components are known. For example, in the field of optics simple absorption color filters may be employed, which however have the disadvantage of a low luminous efficiency. In, for example, color television camera applications this disadvantage is eliminated by the use of so-called dichroic mirrors (color-selective, wide band interference filters). However, such mirrors are very complicated to manufacture and hence expensive.

SUMMARY OF THE INVENTION

It is an object of the invention to provide means for deriving color components, which means have a high luminous efficiency and are simple to manufacture.

This problem is solved in that the spectral regions, or color components, are derived from the diffraction orders of a diffraction grating (phase grating) which is arranged in the pupil of an imaging lens and whose groove profile consists of a plurality of steps which produce differences in optical path length which equal integral multiples of a specific wavelength.

Such diffraction gratings have substantially the same luminous efficiency as dichroic mirrors, but can be manufactured considerably cheaper in large quantities using pressing methods.

Preferred fields of application are film scanning, color television and color facsimile. However, the range of application is not limited to the visible spectral range, but may be easily extended up to the near and far infra-red ranges and beyond these.

BRIEF DESCRIPTION OF THE DRAWINGS

An example and the operation of the diffraction grating are described in more detail with reference to the drawing. In the drawing.

DESCRIPTION OF THE PREFERRED EMBODIMENTS

The operation of the new diffraction grating (phase grating) is based on the fact that the spectral distribution of the light among the diffraction orders greatly depends on the groove profile of said gratings. This groove profile may for example be adapted so that the zeroth diffraction order, i.e. the non-diffracted ray, appears in the green light region, one first diffraction order (for example, the +1 order) in the blue region, and the other first diffraction order (for example, the −1 order) in the red region. If such a grating is disposed in the pupil of an imaging lense, the corresponding color components in blue, green, and red are obtained side by side instead of as a normal image.

Figure 1:
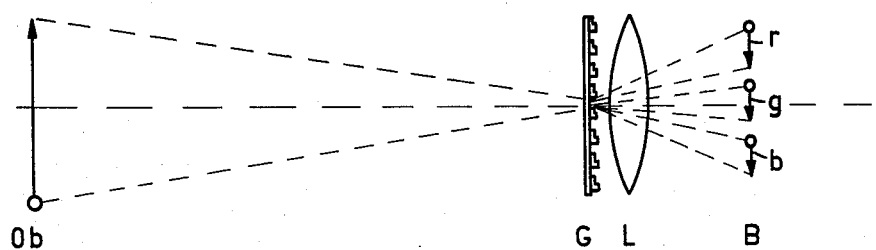
FIG. 1 shows a device according to the invention in an optical arrangement for deriving color components.

Without diffraction grating G the optical arrangement in accordance with FIG. 1 would produce the normal color image of the object Ob at the location of the color component g. By means of the diffraction grating secondary images corresponding to the diffraction orders are obtained at the locations thereof, which in the case of an adequate spacing between the diffraction orders relative to the size of the images appear separately adjacent each other in the image plane. The groove profile of the diffraction grating (phase grating) is now adapted so that, for example, at the location of the central normal image a green image component appears, and at the location of the two first orders a red image component and a blue image component appear, respectively.

Figure 2:
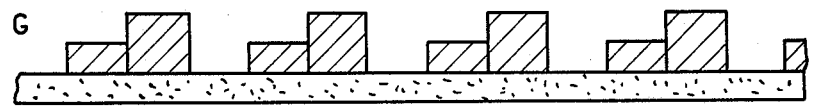
FIG. 2 shows an example of a diffraction grating according to the invention with a stepped groove profile.

This can for example may be achieved with a groove profile in accordance with FIG. 2, which consists of a stepped structure, formed from a dielectric plate having the refractive index n. The plate is substantially planar and the plane of the plate can be defined by two orthogonal axes therein. The geometrical height, or thickness, varies as a repetitive, stepped function of location on the plate, preferably as a function along only one coordinate axis, and is selected so that the difference in optical pathlength $(n-1)d$ produced in it (relative to vacuum or air) is an integral multiple of a selected wavelength $\lambda_g$, $\lambda_g$ here representing the central wavelength of the light in the green image component:

$$(n-1)d_1 = K_1 \cdot \lambda_g;\ (n-1)d_2 = K_2 \cdot \lambda_g \qquad (1)$$

where $d_1$ and $d_2$ are the geometrical thicknesses of the two steps in each staircase portion in accordance with FIG. 2, and $K_1$ and $K_2$ are integers. Thus, the plate is provided with a series of parallel grooves.

Light of the wavelength $\lambda_g$ is then not diffracted by the diffraction grating, whereas light of any different wavelength $\lambda$ is diffracted from the direction perpendicular to the plane of the grating depending on $\lambda$. By the formation of asymmetrical steps, in combination with a suitable choice of values $K_1$ and $K_2$, it can be ensured that blue light is mainly diffracted in one first order and at the same time red light is mainly diffracted in another first order. In FIG. 2 these values have been selected so that $K_1 = 2$ and $K_2 = 4$.

Figure 3:
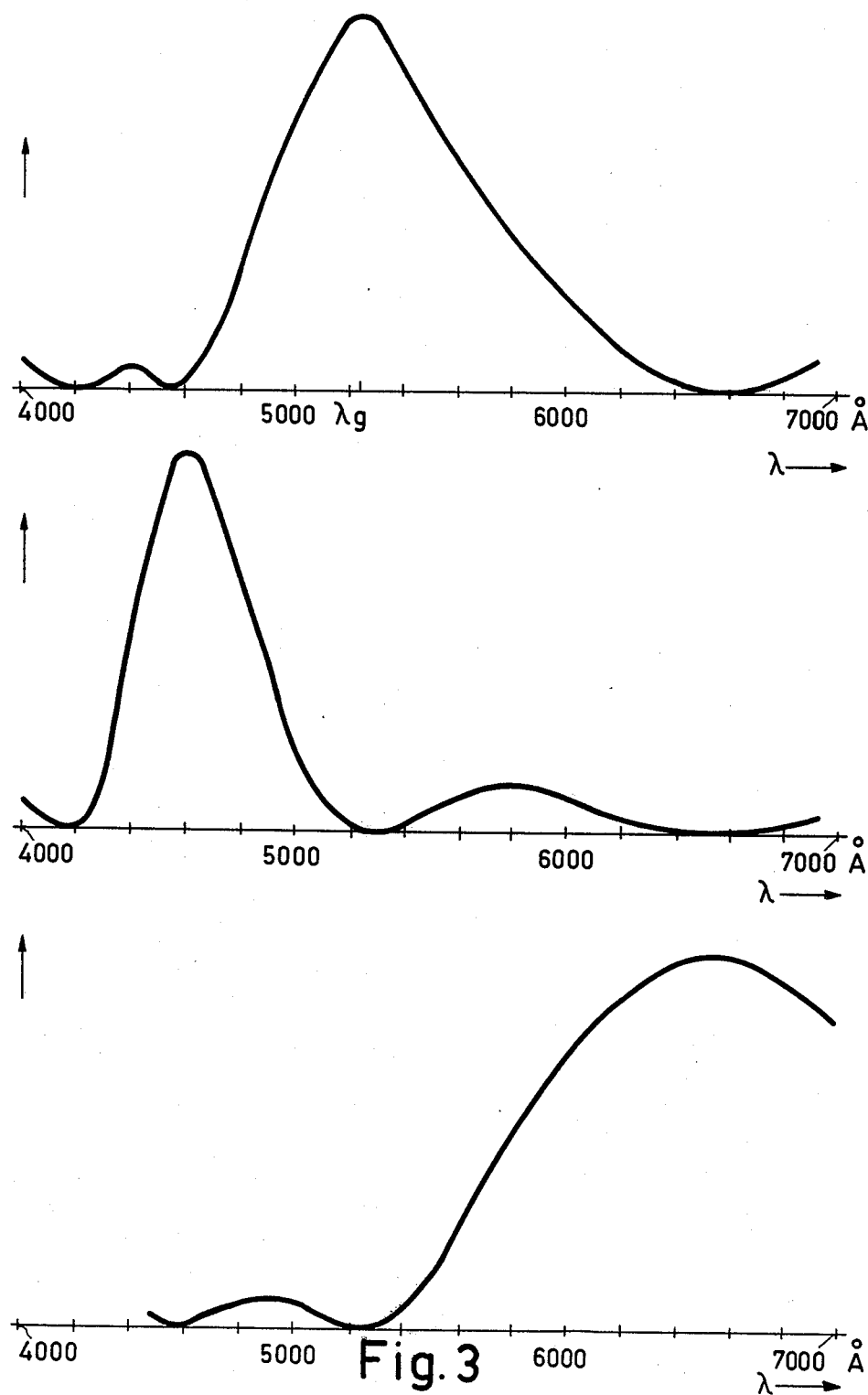
FIG. 3 shows the spectral distribution of the light among the diffraction orders when using diffraction gratings with a groove profile in accordance with FIG. 2.

The spectral light distribution among the direct beam and the two first diffraction orders associated with the groove profile of FIG. 2 is shown in FIG. 3. For the calculation of the three curves it has been assumed that the refractive index for the spectral range under consideration, from approx. 400 to 700$\mu$, does not depend on the wavelength. For the curves in FIG. 3 $\lambda_g = 525\mu$ and the maxima of the intensity distribution in the two other color components (blue, red) are situated at 459$\mu$ and 656$\mu$ respectively. At the locations of maximum intensity in one color component the two other color components have zero intensity.

FIGS. 2 and 3 illustrate the situation for a particularly simple example of a groove profile, where moreover the refractive index n is assumed to be constant. Other groove forms may be obtained by other suitable choices of the values $K_1$ and $K_2$. Furthermore, the groove profiles may comprise more than two stages of steps (in addition to the basic stage), in which case again other suitable combinations of the values $K_1$, $K_2$, $K_3$ etc. can be selected. Moreover, the refractive index n and its variation as a function of the wavelength of light $\lambda$ may be adjusted between certain limits by the selection of suitable dielectrics.

Consequently, there are many groove profiles which are suitable for the formation of color component images by diffraction gratings. They differ in producing different spectral distributions (spectral bands) for the color components (example of FIG. 3), in which diffraction orders higher than the first order may be produced and in which more than three color components may be produced.

Of special significance are stepped groove profiles (see FIG. 2) with a small number of steps and values for $K_1$, $K_2$, $K_3$ etc, which are not too high. Stepped groove profiles with steps which produce optical pathlengths differences equal to integral multiples of a specific wavelength, have the special advantage that the color component corresponding to this wavelength is produced on the optical axis as a central undiffracted zero-order image. This central image then exhibits no color dispersion.

Depending on the spectral width of the color component the non-central images exhibit varying degrees of color dispersion, i.e. they are blurred in one direction (the direction of splitting by the grating), thereby having a lower resolution than in the other direction. For certain applications this reduced resolution owing to dispersion is tolerable, to an extent. In color television the color signals for red and blue can be transmitted with reduced bandwidth, which corresponds to a reduced resolution in the corresponding color components. For film scanning and color facsimile only one dimensional images are involved right from the beginning (owing to the line scanning), so that a certain dispersion transversely to the line will have no adverse effect.

Figure 4:
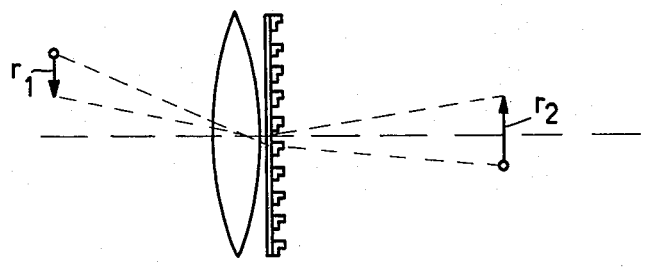
FIG. 4 shows an optical arrangement using a diffraction grating for the elimination of color dispersion in the diffracted orders.

In applications in which color dispersion is not tolerable, this dispersion should and can be eliminated by secondary imaging of the relevant color components with an optical dispersion-compensating component. A possibility for this is shown in FIG. 4: the dispersion appearing in the original color component (for example $r_1$ in FIG. 4) is compensated through imaging by means of a grating G'. This grating may, for example, be a diffraction grating in accordance with the invention. However, in this case it is advantageous to use a grating whose groove profile is optimum for minimizing the loss of light in the relevant color component.

Figure 5:
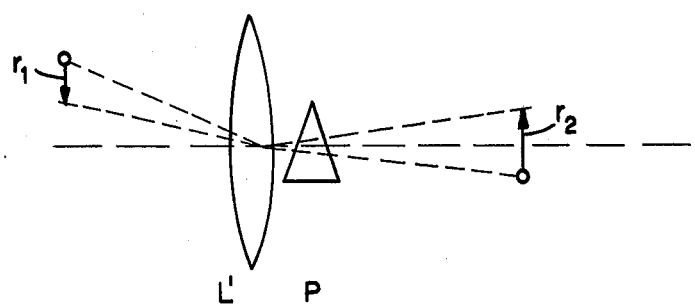
FIG. 5 shows an alternative embodiment using a prism to eliminate color dispersion in the diffracted orders.

An alternative which gives at least an approximate compensation of the dispersion is the use of a prism P instead of the grating G' (FIG. 5). In each case a geometrical separation of the images formed in accordance with FIG. 1 is necessary, which can be achieved without loss of light, for example by means of mirrors. The dispersion in the non-central images can then be eliminated for all these images at the same time in one optical path.

What is claimed is:

1. A diffraction grating, for dividing multichromatic light passing through the grating into spacially separate spectral regions, comprising a substantially planar dielectric plate having a thickness which varies as a repetitive, stepped function of location on the plate, said function being chosen to produce optical path length differences, in said light, which are integral multiples of a selected wavelength.

2. A diffraction grating, as claimed in claim 1, wherein the repetitive, stepped function is also asymmetric.

3. A diffraction grating, as claimed in claim 2, wherein the plane of the plate has two orthogonal coordinate axes therein, and the thickness of the plate varies as a function along only one coordinate axis of the plate, and wherein the function is asymmetric about any plane perpendicular to the one coordinate axis, whereby the plate has a series of grooves therein running parallel to the direction of the other coordinate axis of the plate.

4. A diffraction grating, as claimed in claim 3, wherein the selected wavelength is in the green spectrum of physical light, whereby a green spectral region is formed as the central, undiffracted order.

5. A diffraction grating, as claimed in claim 4, wherein two first order spectral regions are produced, one being a blue region and the other being a red region.

6. A diffraction grating, as claimed in claim 3, wherein the selected wavelength is in the infra-red spectrum.

7. A diffraction grating, as claimed in claim 3, 4, or 5, wherein the thickness of the plate varies in three steps which produce path length differences of 2 and 4 wavelengths and wherein the plate is substantially non-reflective.

8. An optical system, for dividing multichromatic light passing through the system into spacially separate spectral regions, comprising:
a substantially planar dielectric plate, the plane of the plate having two orthogonal coordinate axes therein, said plate having a thickness which varies as a repetitive, stepped function along only one coordinate axis of the plate, said function being asymmetric about any plane perpendicular to the one coordinate axis, said function being chosen to produce optical path length differences, in said light, which are integral multiples of a selected wavelength, said dielectric plate being disposed in the pupil of an imaging lens, whereby a plurality of spacially separated spectral regions are formed from said light passing through said plate; and
an optical dispersion-compensating component, arranged in at least one spectral region, for eliminating dispersion of the wavelength components of said spectral region.

9. An optical system, as claimed in claim 8, wherein the optical component comprises a prism disposed behind a second imaging lens.

10. An optical system, as claimed in claim 8, wherein the optical component comprises a second dielectric plate, having a thickness which varies as a repetitive, stepped function of location on the plate, said function being chosen to produce optical path length differences which are integral multiples of the average wavelength of the one spectral region, said plate being disposed behind a second imaging lens.

11. A diffraction grating, for dividing multichromatic light passing through the grating into spacially separate spectral regions, comprising a substantially planar dielectric plate having a plurality of identical staircase portions in an asymmetric, repetitive pattern, each portion having at least two steps whose thicknesses are different integral multiples of a selected wavelength, said plate being substantially non-reflective.

* * * * *